United States Patent Office

3,240,840
ALKYLATION OF HYDROCARBONS
Anthony George Goble and John Vincent Fletcher, Sunbury-on-Thames, Middlesex, England, assignors to The British Petroleum Company Limited, London, England, a joint-stock corporation of Great Britain
No Drawing. Filed Dec. 20, 1962, Ser. No. 245,994
Claims priority, application Great Britain, Dec. 23, 1961, 22,819/61
14 Claims. (Cl. 260—683.47)

This invention relates to the alkylation of alkanes with olefins.

The alkylation of isoparaffins with olefins is an extensively used commercial process which gives high octane number blending components for gasolines. The catalyst used commercially is either sulphuric or hydrofluoric acid, and it is generally recognised that the use of these highly corrosive liquids is a disadvantage both in the operation of the process and in the disposal of waste products.

The present invention is concerned with the use of a solid catalyst and, according to the present invention, a process for the alkylation of alkanes with olefins comprises contacting a mixture of alkanes and olefins under alkylating conditions with a catalyst prepared by contacting a halogenatable inorganic oxide with a compound of general formula

(where X and Y may be the same or different and selected from H, Cl, Br, F or SCl, or where X and Y together may be O or S) under non-reducing conditions and at a temperature such that chlorine is taken up by the oxide without the production of free inorganic chloride.

Any suitable alkanes and olefins may be used but the preferred alkanes and olefins have from 1 to 10 carbon atoms. Particularly preferred alkanes are the iso-alkanes having from 4 to 10 carbon atoms and particularly preferred olefins are those having from 2 to 6 carbon atoms. Normal olefins are preferred. Thus the iso-alkane may be, for example, iso-butane, and the olefine may be, for example, ethylene, propylene, or a butylene. The alkane is preferably present in exces of the olefin suitable molar alkane/olefin ratios being from 2:1 to 20:1.

Alkylation takes place at relatively low temperatures. Thus a suitable preferred temperature range is 0 to 250° C., preferably 15 to 180° C. The pressure used may be from atmospheric to 1000 p.s.i.g. and the olefin space velocity from 0.1 to 10 LHSV. It may be desirable to add to the reaction zone, hydrogen chloride or a compound decomposable to hydrogen chloride under the alkylation conditions. Thus, hydrogen chloride itself may be added or the additive may be a compound of chlorine and one or more of the elements, carbon, hydrogen or oxygen. Particularly preferred compounds are chloro-substituted derivatives of $C_1$-$C_4$ aliphatic hydrocarbons. Specific examples of suitable compounds are carbon tetrachloride, chloroform, methylene chloride, and tertiary butyl chloride, the first-mentioned of these being particularly suitable. Although certain of the compounds mentioned are also suitable for use in the preparation of the catalyst, the mechanism by which a further improvement in the process is obtained is not connected with the formation of active catalyst material in situ in the reaction zone, since active catalysts cannot be prepared in the presence of hydrogen.

The hydrogen chloride or chlorine compound may be added to the reaction zone in any convenient manner, for example by direct injection or, preferably, by the addition to the feedstock.

The amount of hydrogen chloride or decomposable chloride added may conveniently be within the range 0.01 to 10% wt. of chlorine by weight of olefin.

The alkylation process is preferably operated in the vapour phase. The catalyst may be in the form of a fixed, moving or fluidised bed, preferably the former.

The inorganic oxide besides being halogenatable under the conditions specified above should also clearly have the desired physical characteristics to render it suitable as a hydrocarbon conversion catalyst. It is preferably a refractory oxide selected from Groups II to V of the Periodic Table, for example, alumina, boria, silica, titania, or zirconia. Mixtures of two or more inorganic oxides may be used if desired, one of them being, preferably, alumina. The preferred refractory oxide is alumina. The present invention will, for convenience, be subsequently described with reference to the preferred inorganic oxide, alumina.

Any of the forms of alumina suitable as a base for reforming catalysts may be used, but a particularly preferred form is one derived from an alumina hydrate precursor in which the trihydrate predominates. One containing a major proportion of β-alumina trihydrate is particularly suitable. A convenient method of preparing the alumina is by hydrolysis of an aluminium alcoholate, for example aluminium isopropoxide, in an inert hydrocarbon solvent, for example, benzene. Other things being equal, the greater the amount of chlorine taken up by the alumina, the greater is the activity of the catalyst and since, as stated above, the maximum amount of chlorine which can be added is related to the surface area, it is desirable that the alumina should have a high surface area, for example more than 250 m.²/g. and preferably more than 300 m.²/g.

Other features of the catalyst preparation may be as described in co-pending U.S. patent application Serial No. 135,426 filed September 1, 1961. Thus a particular feature is the specific form of chlorination which produces active low temperature conversion catalysts.

The following examples of compounds giving active and inactive catalysts respectively illustrate the specific nature of the compounds used.

Compounds giving active catalysts:

Carbon tetrachloride ($CCl_4$)
Chloroform ($CHCl_3$)
Methylene chloride ($CH_2CH_2$)
Dichlorodifluoromethane ($CCl_2F_2$)
Trichlorobromomethane ($CCl_3Br$)
Thiocarbonyltetrachloride ($CCl_3SCl$)

Compounds giving inactive catalysts:

Hydrogen chloride (HCl)
Chlorine ($Cl_2$)
Methyl chloride ($CH_3Cl$)
Acetyl chloride ($CH_3COCl$)
Dichloroethane ($CH_2Cl$—$CH_2Cl$)
Tetrachloroethane ($CHCl_2$—$CHCl_2$)
Tetrachloroethylene ($CCl_2$=$CCl_2$)

In the case of compounds containing elements other than chlorine, carbon and hydrogen, the treatment may add the other elements to the catalyst in addition to the chlorine. For example treatment with dichlorodifluoromethane results in the uptake of both chlorine and fluorine onto the catalyst. It has been found, however, that catalysts so prepared are still active for low temperature conversion, and they may have, in addition, other properties resulting from the addition of the other elements. It has also been found that small amounts of halogens (including chlorine) which may be present in the alumina prior to the chlorination treatment of the present invention do not adversely affect the activity of the catalysts for low temperature conversion. Thus, the alumina used may already contain up to 1% wt. of chlorine and/or fluorine, as when, for example, the initial material which is chlorinated by the process of the present invention is a catalyst normally used for the reforming of gasoline oiling range hydrocarons. The preferred compounds giving active catalysts are carbon tetrachloride, chloroform and methylene chloride.

The compounds covered by the general formula in which X and Y together are O or S are phosgene and thiophosgene.

The amount of chlorine added to the catalyst is preferably within the range 1 to 15% wt., the precise amount being dependent on the surface area as measured by low temperature nitrogen adsorption. It has been found that the maximum amount of chlorine which can be added without the formation of free aluminium chloride is related to the original surface areas of the catalyst and is about $3.0-3.5 \times 10^{-4}$ g./m.$^2$. Maximum chlorination is preferred, but lower amounts of chlorine still give active catalysts and a suitable range is, therefore, from $2.0 \times 10^{-4}$ to $3.5 \times 10^{-4}$ g./m.$^2$.

The non-reducing conditions used for the chlorination may be either inert or oxidising conditions, the latter being preferred. A convenient method of contacting the alumina is to pass a gaseous stream of the chlorine compound of the alumina either alone or, preferably, in a non-reducing carrier gas. Examples of suitable carrier gases are nitrogen, air or oxygen.

Non-reducing conditions are essential, since reducing conditions tend to convert the chlorine compound to hydrogen chloride, which gives an inactive catalyst. The temperature for the chlorination may be from 300–1100° F. (149–593° C.). The tendency to form free aluminium chloride increases with temperature and care should, therefore, be exercised when using the higher temperature within the stated range. Since the temperatures used will normally be above the volatilisation temperature of aluminium chloride the formation of free aluminium chloride is readily detected by its appearance in the gaseous reaction products. The chlorination reaction is exothermic and the temperatures specified are the initial temperatures used.

The rate of addition of the chlorine compound is preferably as low as practicable to ensure uniform chlorination and to avoid a rapid increase of temperature as a result of the exothermic reaction. Preferably the addition rate does not exceed 1.3% wt. of chlorine compound by weight of catalyst per minute. If a carrier gas is used, the rate of flow is preferably at least 200 volumes/volume of catalyst/hour and a convenient range is 200–1000 v./v./hr. The pressure used is conveniently atmospheric.

The active catalyst is susceptible to hydrolysis in the presence of water and should, therefore, be stored under anhydrous conditions. Similarly, the materials used in the catalyst preparaion should also be free from water.

However, a particular feature of the present method of catalyst preparation is the use of relatively inert, readily vaporised, non-corrosive, chlorinating compounds. The use of such compounds allows the catalyst to be prepared in situ in the alkylation reactor, thereby minimising the difficulties resulting from the sensitivity of the catalyst to water.

It follows that the alkylation feedstock used should also be free from water and also from sulphur compounds which may be catalyst poisons. It may also be desirable to keep the aromatic content of the feedstock as low as practicable.

The invention is illustrated by the following example:

*Example*

A catalyst having the following composition

| | Percent weight |
|---|---|
| Platinum | 0.53 |
| Chlorine | 12.6 |
| Hydrogen | 0.20 | was prepared by contacting 150 ml. of a platinum-on-alumina catalyst, containing 0.58 percent weight of platinum and 0.81 percent weight of chlorine, with 30 ml. of dry carbon tetrachloride at 300° C. The carbon tetrachloride was added dropwise over a period of 30 minutes, during which time the catalyst was continually purged with dry nitrogen (200 ml./minute) to remove the products of the reaction.

The cooled catalyst was charged to a vertical reactor and isobutane and propylene (approximate mole ratio 3:1) were passed over it at a temperature of 25° C. and 100 p.s.i.g. pressure. The isobutane liquid space velocity was 1.0 v./v./hr.

Virtually all the propylene was consumed and inspection data on the alkylate product gave the following composition.

| | Percent weight |
|---|---|
| i-$C_4$ | 52.8 |
| i-$C_5$ | 7.5 |
| i-$C_6$ | 16.4 |
| i-$C_7$ | 23.3 |

We claim:

1. A process for the alkylation of alkanes with olefins comprising contacting a mixture of alkanes and olefins under alkylating conditions at a temperature of from 0 to 250° C. with a catalyst prepared by contacting a -halogenatable inorganic oxide with a compound of general formula:

where X and Y are selected from the group consisting of H, Cl, Br, F and SCl, in the absence of free hydrogen, and at a temperature in the range of 149–593° C. such that chlorine is taken up by the halogenatable inorganic oxide without the production of free inorganic chloride.

2. A process as claimed in claim 1 wherein the alkanes and olefins have from 1 to 10 carbon atoms.

3. A process as claimed in claim 2 wherein the alkanes are iso-alkanes having from 4 to 10 carbon atoms and the olefins have from 2 to 6 carbon atoms.

4. A process as claimed in claim 1 wherein the alkane is in excess of the olefin, the molar alkane/olefin ratio being from 2:1 to 20:1.

5. A process as claimed in claim 1 wherein the alkylation temperature is from 15 to 180° C.

6. A process as claimed in claim 1 wherein the pressure is from atmospheric to 1000 p.s.i.g. and the olefin space velocity from 0.1 to 10 LHSV.

7. A process as claimed in claim 1 wherein there is added to the alkylation reaction zone, a compound selected from hydrogen chloride and compounds decomposable to hydrogen chloride under the alkylation conditions.

8. A process as claimed in claim 1 wherein the halogenatable inorganic oxide is alumina.

9. A process according to claim 1 where the metal halogenatable inorganic oxide is selected from Groups II to V of the Periodic Table.

10. A process according to claim 1 wherein the amount of chlorine present in the catalyst is in the range $2.0 \times 10^{-4}$ to $3.5 \times 10^{-4}$ g./m.$^2$.

11. A process according to claim 1 where the chlorinating agent is carbon tetrachloride.

12. A process according to claim 1 where the chlorinating agent is chloroform.

13. A process according to claim 1 where the chlorinating agent is methylene chloride.

14. A process for the alkylation of alkanes with olefins comprising contacting a mixture of alkanes and olefins under alkylating conditions at a temperature of from 0 to 250° C. with a catalyst prepared by contacting a halogenatable inorganic oxide with a compound of general formula:

where X and Y together form a divalent radical selected from the group consisting of O and S, in the absence of free hydrogen and at a temperature in the range of 149°–593° C. such that chlorine is taken up by the oxide without the production of free inorganic chloride.

References Cited by the Examiner

UNITED STATES PATENTS

| | | | |
|---|---|---|---|
| 2,642,384 | 6/1953 | Cox | 208—139 |
| 2,777,805 | 1/1957 | Lefrancois et al. | 260—683.65 |
| 2,798,105 | 7/1957 | Heinemann et al. | 260—683.65 |
| 2,944,097 | 7/1960 | Starnes et al. | 260—683.68 |

FOREIGN PATENTS

| | | |
|---|---|---|
| 1,299,388 | 6/1962 | France. |

OTHER REFERENCES

Emmett, P. H.: Hydrocarbon Catalysis, vol. VI, N.Y. Reinhold, 1958.

Royals, E. E.: Advanced Organic Chemistry, London, Constable and Company, 1954.

DELBERT E. GANTZ, *Primary Examiner.*

JOSEPH R. LIBERMAN, ALPHONSO D. SULLIVAN, *Examiners.*